United States Patent
Huang et al.

(10) Patent No.: US 8,228,842 B2
(45) Date of Patent: Jul. 24, 2012

(54) SYSTEM, METHOD AND TERMINAL FOR MULTIMEDIA BROADCAST/MULTICAST SERVICE DATA TRANSMISSION

(75) Inventors: Qing Huang, Beijing (CN); Feng Xie, Beijing (CN); Nanju Wang, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 902 days.

(21) Appl. No.: 12/116,456

(22) Filed: May 7, 2008

(65) Prior Publication Data
US 2008/0305739 A1 Dec. 11, 2008

(30) Foreign Application Priority Data
May 8, 2007 (CN) .......................... 2007 1 0098999

(51) Int. Cl.
H04W 4/00 (2009.01)
(52) U.S. Cl. ........................... 370/328; 370/235
(58) Field of Classification Search .......... 370/328–329, 370/335–336, 342–343, 345, 432, 437, 440–444, 370/235–236
See application file for complete search history.

(56) References Cited

U.S. PATENT DOCUMENTS

| | | | |
|---|---|---|---|
| 6,707,809 B1 * | 3/2004 | Warrier et al. | 370/351 |
| 7,088,692 B1 * | 8/2006 | Gronroos | 370/328 |
| 7,409,207 B2 * | 8/2008 | Wieczorek et al. | 455/418 |
| 7,756,074 B2 * | 7/2010 | Beckmann et al. | 370/328 |
| 2003/0035423 A1 * | 2/2003 | Beckmann et al. | 370/390 |
| 2004/0038678 A1 * | 2/2004 | Lescuyer et al. | 455/424 |
| 2004/0085922 A1 * | 5/2004 | Herle | 370/328 |
| 2005/0122945 A1 * | 6/2005 | Hurtta | 370/338 |
| 2006/0128406 A1 * | 6/2006 | Macartney | 455/466 |
| 2006/0294195 A1 * | 12/2006 | Hyatt | 709/217 |
| 2008/0139113 A1 * | 6/2008 | Ho et al. | 455/7 |
| 2009/0168721 A1 * | 7/2009 | Chen | 370/331 |
| 2009/0290541 A1 * | 11/2009 | Nishio | 370/328 |

OTHER PUBLICATIONS

Japanese Examination Report of Japan Application No. 2008-120863, dated on Dec. 19, 2011.

* cited by examiner

Primary Examiner — Chi H. Pham
Assistant Examiner — Kevin Mew
(74) Attorney, Agent, or Firm — J.C. Patents

(57) ABSTRACT

The present invention relates to a system, a method and a terminal for multimedia broadcast/multicast service data transmission. The system includes: a radio network controller (RNC), a service general packet radio service supporting node (SGSN), gateway general packet radio service supporting node (GGSN), a broadcast/multicast service center, an UE type inquiry module, a database, and a processing module. The network resource waste is avoided, and the effectiveness of media resource transmission is guaranteed through the present invention.

15 Claims, 5 Drawing Sheets

SYSTEM, METHOD AND TERMINAL FOR MULTIMEDIA BROADCAST/MULTICAST SERVICE DATA TRANSMISSION

FIELD OF THE INVENTION

The present invention relates to network communication field, and more particularly to a system, a method and a terminal for multimedia broadcast/multicast service data transmission.

BACKGROUND OF THE INVENTION

With the improvement of people's living level and the development of communication technology, users not only need the mobile communication service such as a conventional telephone, a message, etc. but also have demand for the mobile multimedia service. Because the existing IP multicast technique is not suitable for a mobile communication network to implement the mobile multimedia service, a multimedia broadcast/multicast services (MBMS) is proposed by the third generation mobile communication partner program (3GPP). A data source is provided in the mobile communication network for performing point-to-multi-points service for many user equipments, sharing network source, and improving the utilization rate of network source. The MBMS has two means: broadcast and multicast. The MBMS not only can achieve broadcast and multicast for pure text with low rate, but can also achieve broadcast and multicast for multimedia with high rate.

Based on the packet network of WCDMA/GSM, MBMS adds some new function entities into the packet network of WCDMA/GSM such as broadcast multicast service centre (BM-SC) for introducing an MBMS function into an existing package area function entity, e.g. service general packet radio service supporting node (SGSN), gateway general packet radio service supporting node (GGSN), radio network controller (RNC), and user equipment (UE). A new logic share channel is defined to achieve air interface resource share in 3GPP standard. Schematic diagram illustrating the system architecture of the MBMS system is shown in FIG. 1. The MBMS service module is set in the RNC connected to the UE. The RNC, SGSN, GGSN, BM-SC is connected one after another to form the MBMS service system.

Based on the above-mentioned MBMS service system, a complete flow for the MBMS service can be described as follows:

1, User subscription: establishing a relation between a UE and a service provider;
2, Service announcement: informing the UE of information related to the MBMS service;
3, Joining: joining in a multicast group to UE and informing a network UE of receiving multicast data;
4, Session start: indicating that the BM-SC is ready and preparing for sending data;
5, MBMS notification: informing the UE that MBMS data is ready for sending;
6, Data transfer: transmitting data at user level;
7, Session stop: deciding to end data transmission within a certain period and releasing bearing resource by the BM-SC;
8, Leaving: UE leaving the multicast group and not receiving service data any more.

The step 1, 3, and 8 are indispensable for multicast service. MBMS radio transmission bearing means can be generalized by point-to-point (PtP) and point-to-multipoint (PtM). Under the PtP, service is born point-to-point, that is, each UE transmits service data separately. Under the PtM, service is born point-to-multipoint, that is, many UEs transmit service data at the same time.

During the establishment process of an MBMS service, after receiving a service establishment request initiated by a core network, the radio network needs to calculate the number of UEs and determine the specific radio bearing means according to the utilization situation of the current service. When the statistic result shows that the number of UEs exceeds the UE number threshold when the PtP mode is transformed to the PtM mode, it is determined that the PtM transmission means is adopted in the MBMS multicast service, and the relevant transmission means is noticed to the UE. If the number of UE does not achieve the transformation threshold from the PtP to the PtM, the PtP transmission means will be adopted. During the transmission of MBMS service, real-time statistic is still needed for the number of UE and the statistic result is used to dynamically adjust the radio transmission bearing means of the current MBMS.

The type of UE is not considered in the prior art whereas different types of UE may correspond to different media resource format in some cases. Using one format for all UEs to transmit the media resource may cause that some media resource cannot be played or used on some UE resulting in the waste of network resource.

SUMMARY OF THE INVENTION

The object of the present invention is to avoid network resource waste, and ensure the effectiveness of media resource transmission in MBMS service.

According to one aspect of the present invention, it provides a system for multimedia broadcast/multicast service data transmission. The system includes a RNC, an SGSN, a GGSN, and a BM-SC connected sequently and further includes:

a UE type inquiry module configured to acquire feedback UE type information;

a database configured to store UE types and media resource types; and a processing module configured to inquire a media resource type matched with the UE in the database according to the UE type information acquired by the UE type inquiry module and calculate the number of UEs matched with the media resource type.

The RNC is configured to determine a bearing means for transmitting the media resource data to the UE according to the number of UEs calculated by the processing module.

In accordance with the system for multimedia broadcast/multicast service data transmission mentioned in the present invention, the UE type inquiry module determines the adopted bearing means after acquiring the UE type information and transmits the to-be-transmitted MBMS media resource to the UE matched with the media resource type. The accuracy of bearing means for network resource transmission is ensured so as to avoid the waste of network resource and guarantee the effectiveness of media resource transmission.

According to another aspect of the present invention, it provides a method for multimedia broadcast/multicast service data transmission. The method includes following steps:

acquiring feedback UE type information after receiving a service establishment request;

calculating the number of UEs matched with the type of the to-be-transmitted media resource according to the UE type information;

determining whether the number of UEs is greater than a preset threshold; if the number of UE is greater than the preset threshold, adopting a point-to-multi-points bearing means to send the media resource; if the number of UE is not greater than the preset threshold, adopting a point-to-point bearing means to send the media resource.

The method for multimedia broadcast/multicast service data transmission in accordance with the present invention determines the bearing means for data transmission after acquiring the UE type information sends to-be-transmitted MBMS media resource to the UE matched with the media resource type. The accuracy of bearing means for network resource transmission is ensured so as to avoid the waste of network resource and guarantee the effectiveness of media resource transmission.

According to another aspect of the present invention, it provides a terminal for multimedia broadcast/multicast service. The terminal includes a mobile communication terminal, and further includes a UE type feedback module adapted to send UE type information.

The terminal for multimedia broadcast/multicast service data transmission in accordance with the present invention can send UE type information to mobile communication network by setting the UE type feedback module so as to enable the mobile communication network to perform accurate statistical calculation for the number of UEs, furthermore to ensure the multimedia broadcast/multicast service data transmission to adopt an accurate and effective bearing means.

DETAILED DESCRIPTION OF THE PREFERRED EMBODIMENTS

The technical solution of the present invention will be more fully described by the following detailed description of preferred embodiments of the present invention which is to be considered together with the accompanying drawings.

Figure 1:
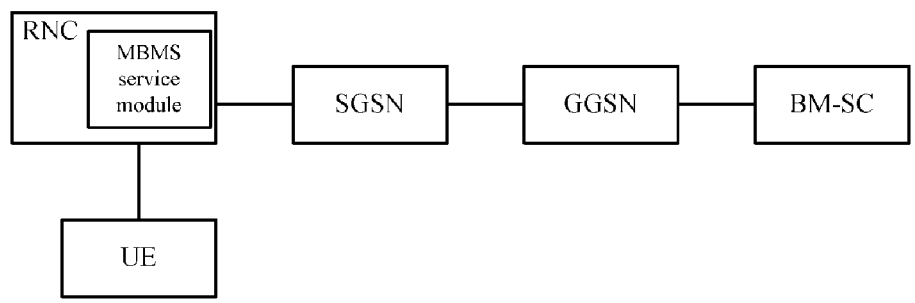
FIG. 1 is a schematic diagram illustrating the architecture for realizing MBMS service in prior art.
Figure 2:
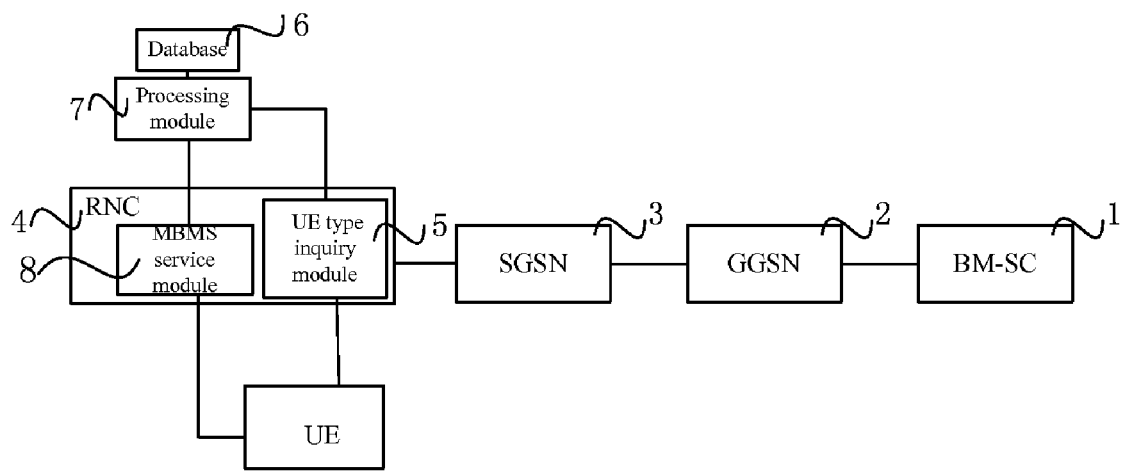
FIG. 2 is one schematic diagram illustrating the embodiment 1 of the system for multimedia broadcast/multicast service data transmission in accordance with the present invention.

The present invention provides a system for multimedia broadcast/multicast service data transmission. FIG. 2 is a schematic diagram illustrating the structure of the system for multimedia broadcast/multicast service data transmission in accordance with embodiment 1 of the present invention. The system includes a RNC 4, a SGSN 3, a GGSN 2, a BM-SC 1, a UE type inquiry module 5, a database 6, a processing module 7, and an MBMS service module 8. The UE type inquiry module 5 is configured to send UE type inquiry information and receive feedback UE type information. The database 6 is configured to store various UE types and media resource types. The processing module 7 is configured to inquire a media resource type corresponding to the UE according to the acquired feedback UE type information in the database 6 and calculate the number of UEs corresponding to the media resource type. The MBMS service module 8 in the RNC 4 determines whether the number of UEs is greater than a preset threshold. If the number of UEs is greater than the preset threshold, the PtM bearing means is adopted to transmit the media resource data; if the number of UEs is not greater than the preset threshold, the PtP bearing means is adopted by the MBMS service module 8 to transmit the media resource data. A feedback module needs to be added in the UE applied in the present invention to return feedback UE type information to the UE type inquiry module.

The MBMS service module 8 obtains a preliminary statistic number of UEs referred in the MBMS service, the preliminary statistic number is acquired without considering the matching situation between the UE type and the media resource. The inquiry UE type information sent by the UE type inquiry module 5 is received by the UE. The UE feeds back the UE type information. The processing module 7 performs media resource matching by inquiring the database 6 after acquiring the feedback UE type information and calculates the number of UEs matching with the type of the to-be-transmitted media resource. The MBMS service module 8 determines whether the number of UEs is greater than preset threshold. If the number of UEs is greater than the preset threshold, the PtM bearing means is adopted to transmit the to-be-transmitted media resource by the MBMS service module 8; if the number of UEs is not greater than the preset threshold, the PtP bearing means is adopted to transmit the to-be-transmitted media resource by the MBMS service module 8.

Figure 3:
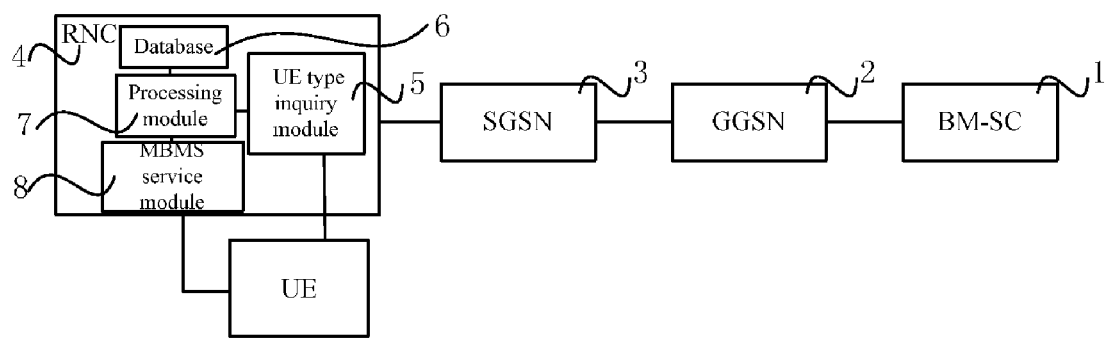
FIG. 3 is another schematic diagram illustrating the embodiment 1 of the system for multimedia broadcast/multicast service data transmission in accordance with the present invention.
Figure 4:
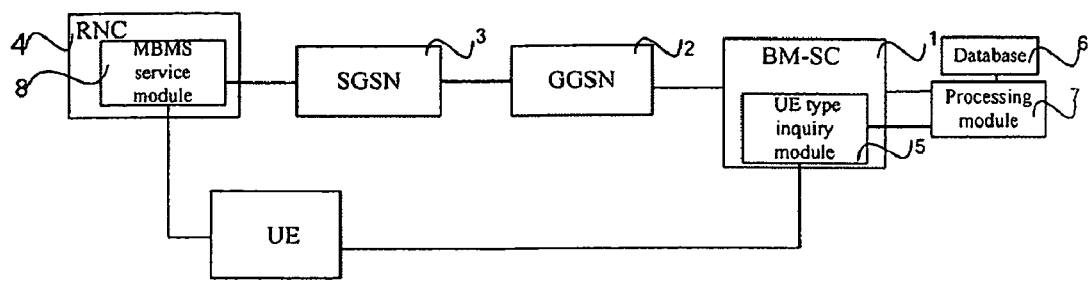
FIG. 4 is another schematic diagram illustrating the embodiment 1 of the system for multimedia broadcast/multicast service data transmission in accordance with the present invention.
Figure 5:
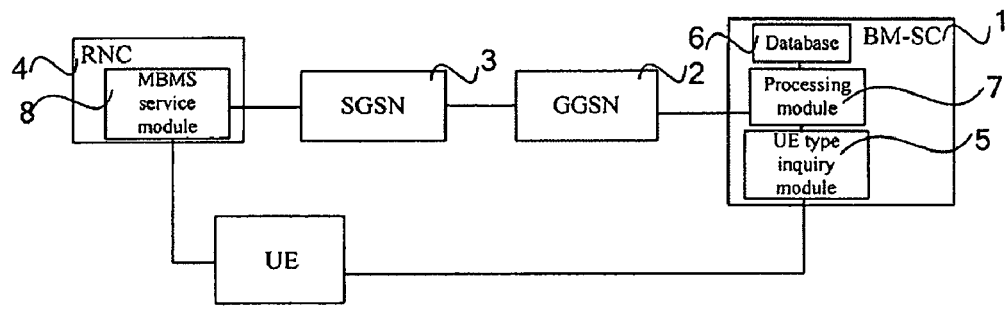
FIG. 5 is another schematic diagram illustrating the embodiment 1 of the system for multimedia broadcast/multicast service data transmission in accordance with the present invention.

In FIG. 2, the processing module 7 and the database 6 are set separately, and directly connected to the MBMS service module 8. The UE type inquiry module 5 is loaded in the RNC 4. The embodiment 1 of the system may also be shown as FIG. 3. The UE type inquiry module 5, the processing module 7, and the database 6 may be all loaded in the RNC 4. Alternatively, as shown in FIG. 4, the processing module 7 and the database 6 are set separately and connected to the MBMS service module 8 via the BM-SC 1, the SGSN 3, and the GGSN 2. The UE type inquiry module 5 is loaded in the BM-SC 1. Alternative, as shown in FIG. 5, the UE type inquiry module 5, the processing module 7 and the database 6 may be all loaded in the BM-SC 1.

In accordance with the embodiment 1 of the system for multimedia broadcast/multicast service data transmission in the present invention, the UE type inquiry module determines the adopted bearing means after acquiring the feedback UE type information by inquiring and transmits the to-be-transmitted MBMS media resource to the UE corresponding to the type of the media resource. The accuracy of network resource transmission bearing means is ensured so as to avoid the waste of network resource and guarantee the effectiveness of media resource transmission.

Figure 6:
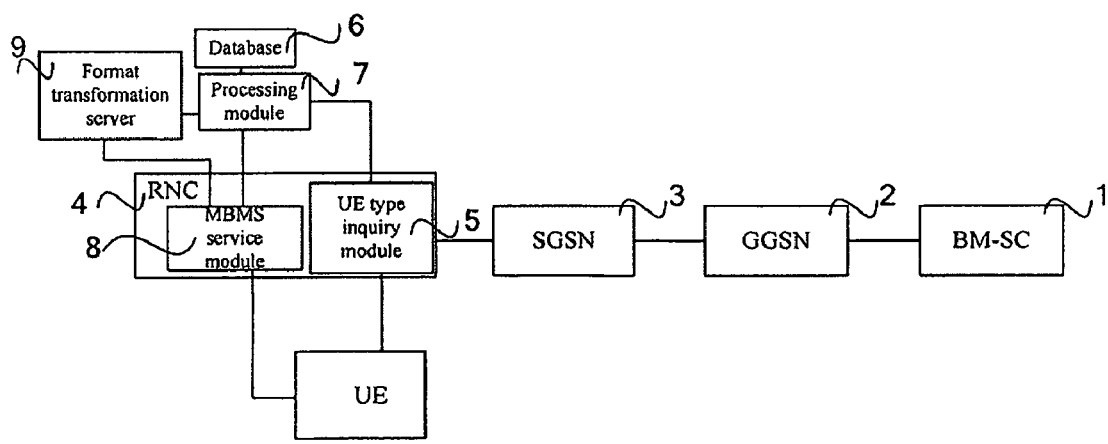
FIG. 6 is one schematic diagram illustrating the embodiment 2 of the system for multimedia broadcast/multicast service data transmission in accordance with the present invention.

The embodiment 1 of the system for multimedia broadcast/multicast service data transmission in the present invention further includes a format transformation server 9, to form the embodiment 2 of the system in the present invention. As show in FIG. 6, one schematic diagram on the basis of the embodiment 1 is provided. The format transformation server 9 is configured to transform the existing format of the to-be-transmitted media resource in the MBMS service module 8 in accordance with the type of the media resource matching with the UE which is acquired after the processing module 7 inquires the database 6. The UE feeds back UE type information after receiving the inquiry UE type information. The processing module 7 inquires the database 6 for performing media resource matching after the processing module 7 acquires the feedback UE type information. The processing module 7 calculates the number of UEs fitting other media formats respectively besides the type of to-be-transmitted media resource. The format transformation server 9 transforms the format of the to-be-transmitted media resource. The processing module 7 calculates the number of UEs matching with other media formats respectively. The MBMS service module 8 determines whether the number is greater than a preset threshold. If the number is greater than the preset threshold, the PtM bearing means is adopted to send one or more types of media resource by the MBMS service module 8; if the number is not greater than the preset threshold, the PtP bearing means is adopted to send one or more types of media resource by the MBMS service module 8.

For example, there are 200 UEs using the MBMS service according to a preliminary calculation of the MBMS service module 8. The types of UEs are divided into a, b, c, and d. The to-be-transmitted media resource format only fits the terminal of type a. Therefore, the format transformation server 9 needs to transform the format for fitting the other three types. Through a determination, the processing module 7 finds out that the type b and type c may match with the same media resource format. The type d matches with another media resource format. Therefore, the to-be-transmitted media resource format is transformed into the media resource formats matched with the type b and c respectively, and the media resource format matched with the type d. The processing module 7 calculates the number of UEs matching with the three media resource formats respectively. For example, the statistic result is 80, 70, and 50. Finally, threshold determination is performed for the three statistic result. The thresholds corresponding to the three media content formats may be same or different. If the number is greater than the threshold, the PtM bearing means is adopted to send the media resource by the MBMS service module 8; if the number is not greater than the threshold, the PtP bearing means is adopted to send the media resource by the MBMS service module 8. Specifically, the media resource is sent according to the media resource formats corresponding to UEs respectively.

In accordance with the embodiment 2 of system for multimedia broadcast/multicast service data transmission in the present invention, The format transformation server transforms the existing format of the to-be-transmitted media resource and the processing module determines the bearing means for transmission, The to-be-transmitted media resource may be transmitted to UEs in different media resource formats so as to further guarantee the effectiveness of media resource transmission.

Figure 7:
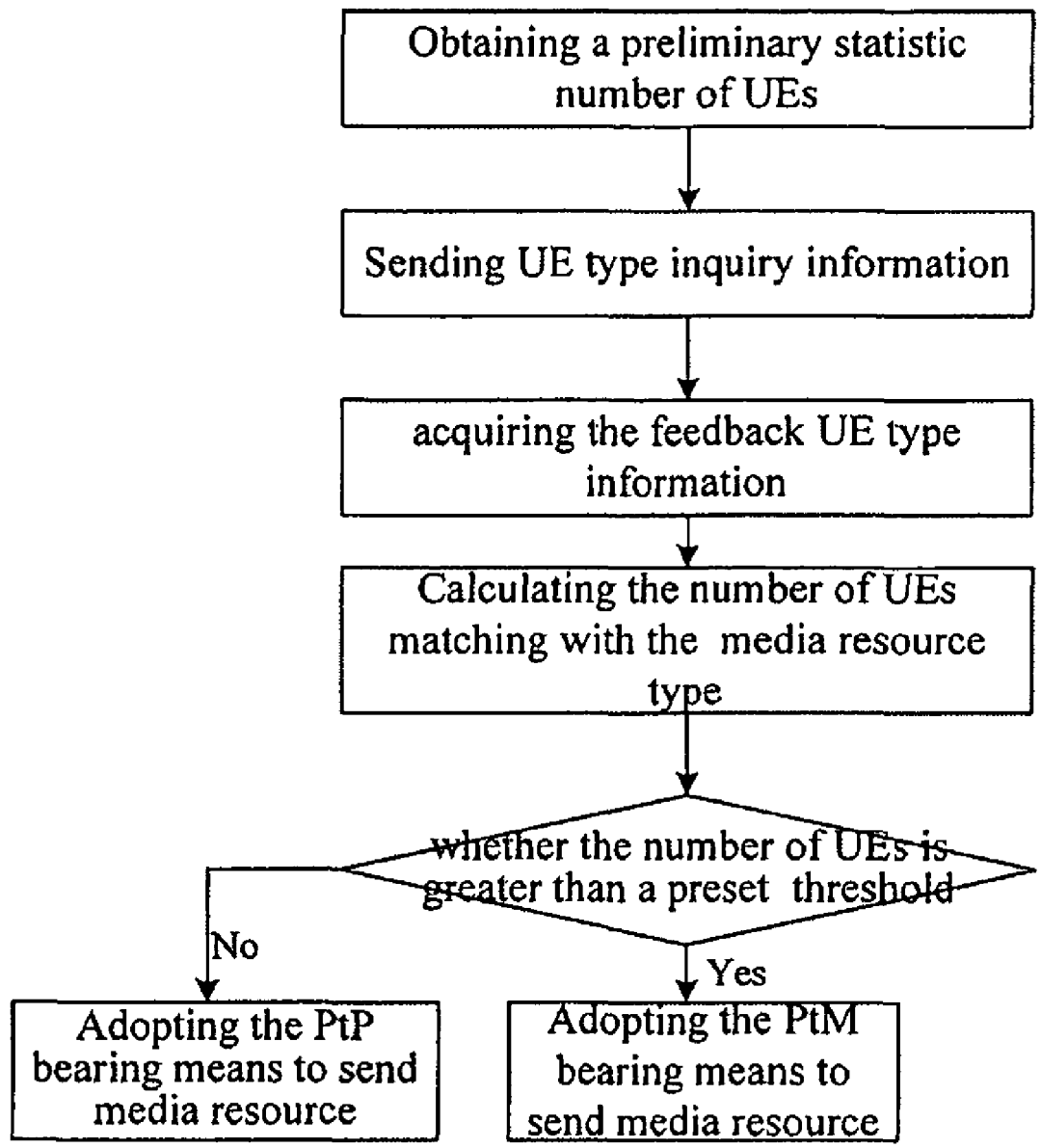
FIG. 7 is one flowchart illustrating the embodiment 1 of the method for multimedia broadcast/multicast service data transmission in accordance with the present invention.

The present invention further provides a method for multimedia broadcast/multicast service data transmission. As shown in FIG. 7, it is a schematic diagram illustrating the embodiment 1 of the method in the present invention. The method specifically includes following steps:

The radio network acquires the feedback UE type information after receiving a service establishment request initiated by the core network;

The number of UEs matching with the type of the existing to-be-transmitted media resource is calculated according to the acquired UE type information;

It is determined whether the number of UEs is greater than a preset threshold. If the number of UEs is greater than the preset threshold, the PtM bearing means is adopted to send the to-be-transmitted media resource; if the number of UEs is not greater than the preset threshold, the PtP bearing means is adopted to send the to-be-transmitted media resource.

Specifically, the feedback UE type information may be acquired by sending inquiry UE type information to the UE requesting to establish the service.

Before sending the inquiry UE type information, it may be included a calculation of the number of UEs requesting to establish the MBMS service. The statistic number is acquired without considering the matching situation between the UE type and the media resource type. The inquiry UE type information is sent to the calculated UE requesting to establish the MBMS service when the inquiry UE type information is sent.

The UE applying in the present invention needs to have the function of feeding back the UE type information.

The embodiment 1 of the method for multimedia broadcast/multicast service data transmission determines a bearing means for transmission after acquiring the feedback UE type information, transmitting the to-be-transmitted MBMS media resource to the UE matching with the media resource type. The accuracy of network bearing means is ensured so as to avoid the waste of network resource.

Figure 8:
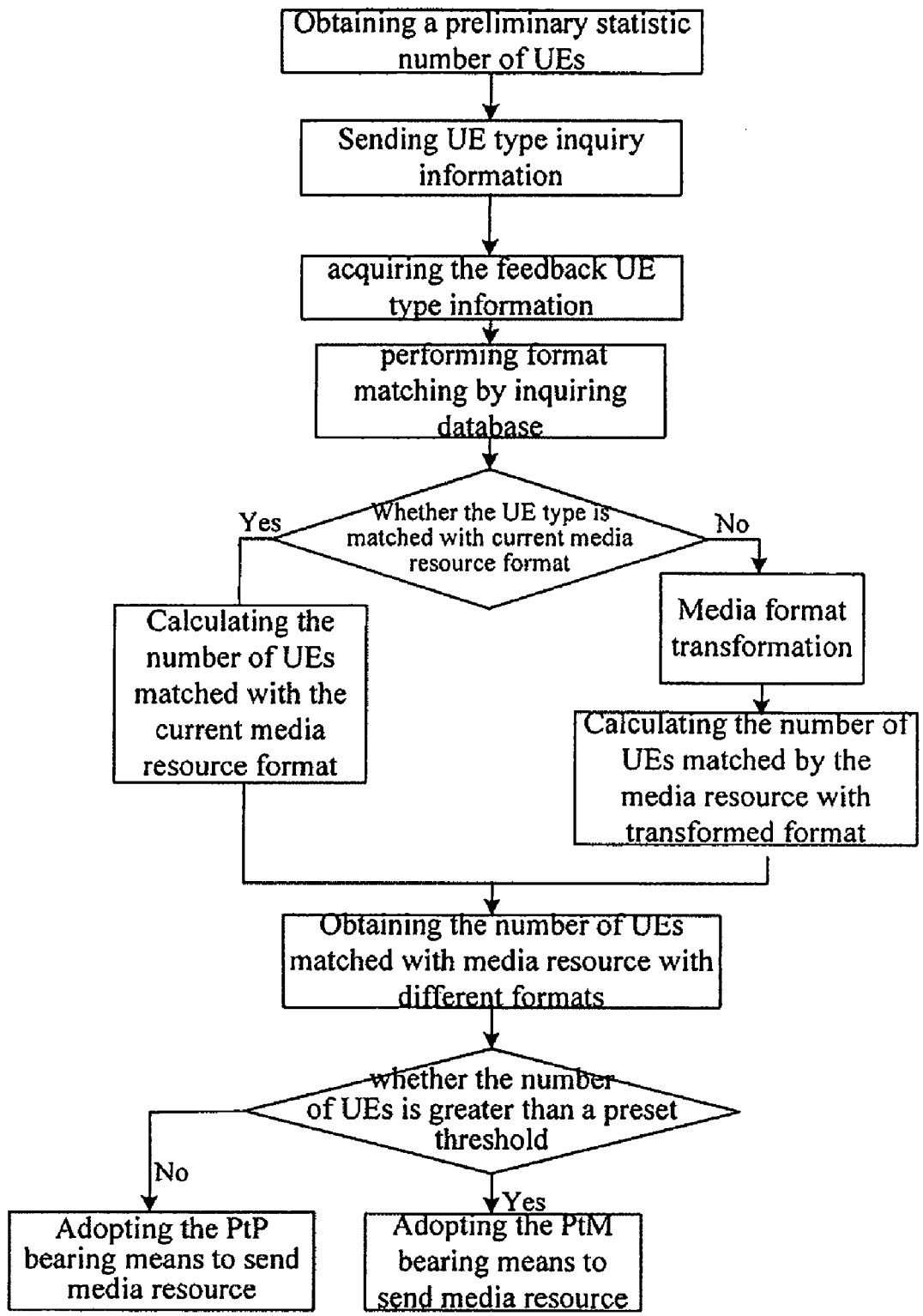
FIG. 8 is one flowchart illustrating the embodiment 2 of the method for multimedia broadcast/multicast service data transmission in accordance with the present invention.

On the basis of the embodiment 1 of the method for multimedia broadcast/multicast service data transmission in the present invention, the following steps may be further included to form the embodiment 2 of the method in the present invention. As shown in FIG. 8, it is a flowchart of the embodiment 2 of the whole method. The method may specifically include following steps:

For the UEs not matching with the to-be-transmitted type of the media resource, the media resource type matching with the UE is acquired by inquiring the database;

The to-be-transmitted media resource type is transformed into the media resource type matching with UEs. The transformed media resource is transmitted. The media resource may be assured to be correctly played or used on each UE by sending the media resource after performing the format transformation for the to-be-transmitted media resource.

Specifically, before the media resource with transformed format is sent, the number of UEs matching with the type of the media resources is further calculated. It is determined whether the number of UEs matching with the media resource types is greater than a preset threshold. If the number is greater than the preset threshold, the PtP bearing means is adopted to send the media resource with transformed format; if the number is not greater than the preset threshold, the PtM bearing means is adopted to send the media resource with transformed format.

For example, there are 200 UEs using the MBMS service according to a preliminary calculation result. The UE types are: a, b, c, and d. The existing format of the to-be-transmitted media resource only fits the type a. Therefore, a content format transformation needs to be performed to-be-transmitted to fit the other three types. By the determination, the type b and type c may match with the same media resource format. The type d matches with another media resource format. Therefore, the existing formats of the to-be-transmitted media resource are transformed into the media resource format matching with the type b and c respectively, and the media resource format matching with the type d. The number of UEs matching with the three media resource formats is calculated respectively. For example, the statistic result is 80, 70, and 50. Finally, a threshold determination is performed for the three statistic result. The thresholds corresponding to the three media content formats may be same or different. If the number is greater than the threshold, the PtM bearing means is adopted to send the media resource; if the number is not greater than the threshold, the PtP bearing means is adopted to send the media resource.

The embodiment 2 of the method for multimedia broadcast/multicast service data transmission in the present invention determines a bearing means for transmission after a format transformation for the to-be-transmitted media resource. The to-be-transmitted media resource may be transmitted to UEs in different media resource formats so as to further guarantee the effectiveness of media resource transmission.

The present invention further provides a terminal for multimedia broadcast/multicast service. The terminal includes a mobile communication terminal, namely UE, and a UE type feedback module configured to send the UE type information. When the UE type information is acquired, the UE type feedback module may feed back the UE type information.

Figure 9:
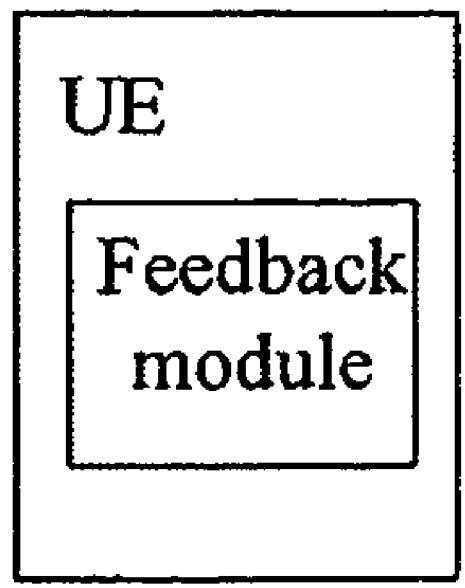
FIG. 9 is a schematic diagram illustrating the embodiment 1 of the terminal for multimedia broadcast/multicast service in accordance with the present invention.

As shown in FIG. 9, it is a schematic diagram illustrating the embodiment 1 of the terminal for multimedia broadcast/multicast service in the present invention. The UE type feedback module and the mobile communication terminal may be set integrated.

Figure 10:
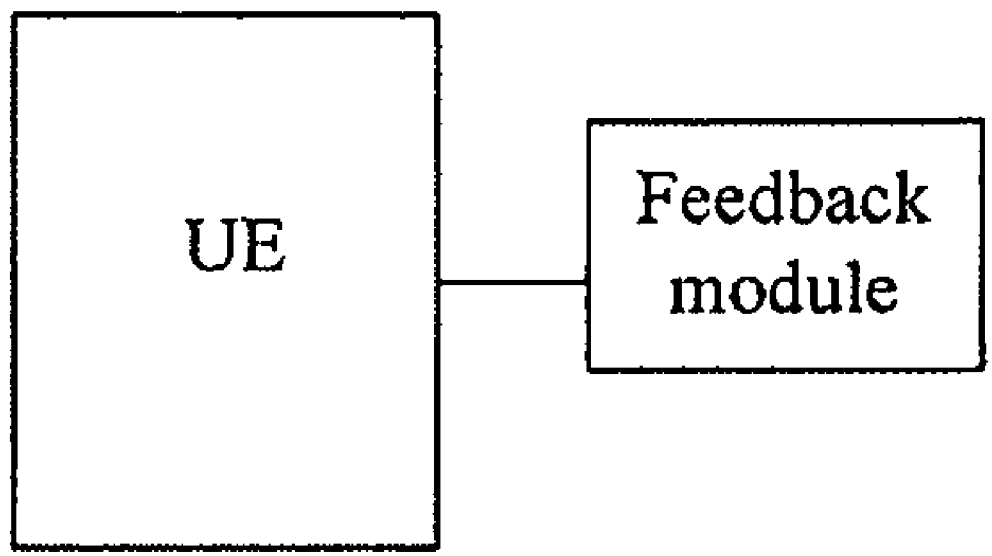
FIG. 10 is a schematic diagram illustrating the embodiment 2 of the terminal for multimedia broadcast/multicast service in accordance with the present invention.

As shown in FIG. 10, it is a schematic diagram illustrating the embodiment 2 of the terminal for multimedia broadcast/multicast service in the present invention. The UE type feedback module and the mobile communication terminal may communicate and be set separately from each other.

The terminal for multimedia broadcast/multicast service data transmission in the present invention includes a UE type feedback module to send the UE type information to the mobile communication network so that the mobile communication network may precisely calculate the number of UEs and guarantee the accurate and effective bearing means to be adopted in the multimedia broadcast/multicast service data transmission.

Finally, it should be understood that the above embodiments are only used to explain, but not to limit the technical solution of the present invention. In despite of describing the present invention in detail with reference to the preferred embodiments, it should be understood that various modifications, changes or equivalent replacements could be made by an ordinary person skilled in the relevant field without departing from the spirit and scope of the technical solution of the present invention, which should be covered in the extent of the claims of the present invention.

What is claimed is:

1. A system for multimedia broadcast/multicast service data transmission, comprising a radio network controller (RNC), a service general packet radio service supporting node (SGSN), a gateway general packet radio service supporting node (GGSN), and a broadcast multicast service centre (BM-SC) connected sequently, further comprising:
   a user equipment (UE) type inquiry module configured to acquire feedback UE type information;
   a database configured to store UE types and media resource types;
   a processing module configured to inquire a media resource type matched with the UE in the database according to the UE type information acquired by the UE type inquiry module and calculate the number of UEs matched with the media resource type;
   wherein the RNC is configured to determine a bearing means for transmitting the media resource data to the UE according to the number of UEs calculated by the processing module.

2. The system according to claim 1, further comprising: a format transformation server configured to transform the format of to-be-transmitted media resource according to the media resource type inquired by the processing module.

3. The system according to claim 1 or 2, wherein the UE type inquiry module is loaded in the RNC.

4. The system according to claim 3, wherein the processing module and the database are set separately, and the processing module is directly connected to the RNC.

5. The system according to claim 3, wherein the processing module and the database are set in the RNC.

6. The system according to claim 1 or 2, wherein the UE type inquiry module is set in the BM-SC.

7. The system according to claim 6, wherein the processing module and the database are set separately, and the processing module is connected to the RNC via the BM-SC, the SGSN, and the GGSN.

8. The system according to claim 6, wherein the processing module and the database are set in the BM-SC.

9. A method for multimedia broadcast/multicast service data transmission, comprising:
   a UE type inquiry module acquiring feedback UE type information after receiving a service establishment request;
   a processing module calculating the number of UEs matched with the type of the to-be-transmitted media resource according to the UE type information;
   a multimedia broadcast/multicast services (MBMS) service module determining whether the number of UEs is greater than a preset threshold; if the number of UE is greater than the preset threshold, adopting a point-to-multi-points bearing means to send the media resource; if the number of UE is not greater than the preset threshold, adopting a point-to-point bearing means to send the media resource.

10. The method according to claim 9, before the UE type inquiry module acquiring feedback UE type information, further comprising:
   the UE type inquiry module sending UE type inquiry information to the UE requesting to establish a service.

11. The method according to claim 10, before the UE type inquiry module sending the UE type inquiry information, further comprising: the MBMS service module calculating the number of UEs requesting to establish the service.

12. The method according to any one of claims 9-11, before the processing module calculating the number of UEs matched with the media resource type, further comprising:
   the processing module inquiring a media resource type matched with the UE according to UE type information of the UE not matched with the media resource type;
   a format transformation server transforming the type of the to-be-transmitted media resource to the inquired media resource type.

13. The system according to claim 1, further comprising a mobile communication terminal and a UE type feedback module configured to send UE type information.

14. The system according to claim 13, wherein the UE type feedback module and the mobile communication terminal are set integrated.

15. The system according to claim 14, wherein the UE type feedback module and the mobile communication terminal are capable of communicating and set separately.

* * * * *